(12) United States Patent
Cao

(10) Patent No.: US 11,372,295 B2
(45) Date of Patent: Jun. 28, 2022

(54) DISPLAY PANEL, MANUFACTURING METHOD THEREOF, AND DISPLAY DEVICE

(71) Applicant: HKC CORPORATION LIMITED, Shenzhen (CN)

(72) Inventor: Junhong Cao, Chongqing (CN)

(73) Assignee: HKC CORPORATION LIMIIED, Shenzhen (CN)

( * ) Notice: Subject to any disclaimer, the term of this patent is extended or adjusted under 35 U.S.C. 154(b) by 0 days.

(21) Appl. No.: 17/042,119

(22) PCT Filed: Dec. 14, 2018

(86) PCT No.: PCT/CN2018/121019
§ 371 (c)(1),
(2) Date: Sep. 26, 2020

(87) PCT Pub. No.: WO2020/113657
PCT Pub. Date: Jun. 11, 2020

(65) Prior Publication Data
US 2021/0018806 A1  Jan. 21, 2021

(30) Foreign Application Priority Data
Dec. 5, 2018 (CN) .......................... 201811476658.4

(51) Int. Cl.
*G02F 1/1362* (2006.01)
*G02F 1/1341* (2006.01)
*G09G 3/36* (2006.01)

(52) U.S. Cl.
CPC ...... *G02F 1/136286* (2013.01); *G02F 1/1341* (2013.01); *G09G 3/3648* (2013.01);
(Continued)

(58) Field of Classification Search
CPC . H01L 27/1259; G03F 7/00; G02F 1/133351; G02F 1/1341; G02F 1/133377; B05D 1/00; G09G 2320/0252
See application file for complete search history.

(56) References Cited

U.S. PATENT DOCUMENTS

2010/0220125 A1    9/2010  Lin et al.
2011/0032469 A1 *  2/2011  Lee .................. G02F 1/1341
                                                349/187
(Continued)

FOREIGN PATENT DOCUMENTS

CN    104516156 A  *  4/2015
CN    104516156 A     4/2015
(Continued)

OTHER PUBLICATIONS

Longming Weng, the ISA written comments, dated Aug. 2019, CN.
Longming Weng, the International Search Report, dated Aug. 2019, CN.

*Primary Examiner* — Mariam Qureshi

(57) ABSTRACT

This application discloses a display panel, a manufacturing method thereof, and a display device. The display panel includes a first substrate, a second substrate parallel arranged to the first substrate, a pixel unit formed between the first substrate and the second substrate. The pixel unit includes at least two kinds of transparent areas and multiple liquid crystal materials injected in the transparent areas. A penetration rate of each of the liquid crystal materials is injected into the transparent areas are different. the liquid crystal materials include a first liquid crystal material, a second liquid crystal material, and a third liquid crystal material. A penetration rate of the first liquid crystal material, the second liquid crystal material, and the third liquid crystal material increases in sequence.

16 Claims, 5 Drawing Sheets

(52) U.S. Cl.
CPC ............... *G09G 2320/0242* (2013.01); *G09G 2320/0252* (2013.01)

(56) References Cited

U.S. PATENT DOCUMENTS

| | | | |
|---|---|---|---|
| 2017/0146860 A1* | 5/2017 | Ma | G02F 1/13394 |
| 2017/0269435 A1* | 9/2017 | Yoon | G02F 1/133528 |
| 2018/0190217 A1* | 7/2018 | Jung | G09G 3/3607 |
| 2019/0204614 A1* | 7/2019 | Saitoh | G02B 3/005 |

FOREIGN PATENT DOCUMENTS

| | | |
|---|---|---|
| CN | 106468840 A | 3/2017 |
| CN | 106873209 A | 6/2017 |
| CN | 108051964 A | 5/2018 |
| CN | 108519697 A | 9/2018 |
| CN | 108919552 A | 11/2018 |

* cited by examiner

DISPLAY PANEL, MANUFACTURING METHOD THEREOF, AND DISPLAY DEVICE

CROSS REFERENCE OF RELATED APPLICATIONS'

This application claims priority to Chinese Patent Application No. CN201811476658.4, filed with the Chinese Patent Office on Dec. 5, 2018 and entitled "DISPLAY PANEL, MANUFACTURING METHOD THEREOF, AND DISPLAY DEVICE", which is incorporated herein by reference in its entirety.

TECHNICAL FIELD

The present application relates to the field of display technologies, and in particular, to a display panel, a manufacturing method thereof, and a display device.

BACKGROUND

The statements herein merely provide background information related to the present disclosure and do not necessarily constitute the related art.

Due to axial light transmission characteristics of liquid crystal molecules of a liquid crystal display (LCD), LCDs have a new solution to overcome technical problems of a large visual angle color cast. At present, one wide visual angle mainstream technology is a fringe field switching (FFS), an in-plane-switching (IPS), and a multi-domain vertical alignment (MVA). MVA techniques are more early used wide visual angle liquid crystal displays. The MVA techniques make use of a protrusion to make the liquid crystal molecules deflect a certain angle, instead of an erect static state of the conventional panel, when the liquid crystal molecules are static. Thus, when the voltage is applied to change liquid crystal molecules as a horizontal state to passes through backlight, the penetrated speed of the backlight is faster, further significantly shortening display time.

When a transmission display panel is designed using an MVA mode, in order to enhance a visual range of image display, the liquid crystal molecules mostly form a multiple region arrangement. However, this multiple region arrangement results in not high penetration rate when the display panel is in a penetrating state, a background image appears whiting or color shift at a large viewing angle, further affecting the image quality.

SUMMARY

An objective of this application is to provide a display panel, a manufacturing method thereof and a display device, to improve color shift at a large viewing angle.

This application provides a display panel, comprising a first substrate, a second substrate parallel arranged to the first substrate, a pixel unit formed between the first substrate and the second substrate. The pixel unit comprising at least two kinds of transparent areas and a plurality of liquid crystal materials injected into the transparent areas, wherein a penetration rate of each of the liquid crystal materials is injected into the transparent areas are different. Optionally, the display panel further comprising scanning line, data lines, and active switches. The data lines are connected with the scanning line and the active switches. The scanning line and the data lines are perpendicularly disposed. A first transparent area, a second transparent area, and a third transparent area are disposed on a same side of the scanning line.

Optionally, when a distance between three kinds of transparent areas and the active switches is greater, the penetration rate is less.

Optionally, area of the first transparent area, area of the second transparent area, and area of the third transparent area are same.

Optionally, the display panel further comprising scanning line, data lines, and active switches. The data lines are connected with the scanning line and the active switches. The scanning line and the data lines are perpendicularly disposed.

Optionally, the second transparent area are disposed on a first side of the scanning line. The first transparent area and third transparent area are disposed on a second side of the scanning line.

Optionally, three kinds of the transparent areas are divided by specific area ratio. An area ratio between the first transparent area and the third transparent area is one to one. The area ratio between the second transparent area and a sum of the first transparent area and the third transparent area is three to two.

Optionally, a penetration rate of the first liquid crystal material, the second liquid crystal material, and the third liquid crystal material increase gradually. Correspondingly, a penetration rate of the first transparent area, the second transparent area, and the third transparent area increases in sequence.

Optionally, a first sub-pixel is a blue sub-pixel. A second sub-pixel is a red sub-pixel. A third sub-pixel is a green sub-pixel.

Optionally, the liquid crystal materials comprise benzoate acid ester materials.

This application further disclosure a manufacturing method of a display panel, steps comprising:
  forming a plurality of pixel units between a first substrate and a second substrate;
  diving each of the pixel units into at least two kinds of transparent areas;
  injecting liquid crystal materials with different penetration rates into each of the transparent areas.

Optionally, a step of inject liquid crystal materials with different penetration rates into each of the transparent areas comprises:
  injecting the liquid crystal material into the transparent areas by a spray method.

Optionally, the liquid crystal material comprises the first liquid crystal material, the second liquid crystal material, and the third liquid crystal material.

The transparent areas comprise a first transparent area, a second transparent area, and a third transparent area.

The first liquid crystal material is injected into the first transparent area. The second liquid crystal material is injected into the second transparent area. The third liquid crystal material is injected into the third transparent area.

This application further disclosure the display device, comprising the display panel and a backlight module.

The display panel comprises the first substrate, the second substrate parallel arranged to the first substrate, the pixel unit formed between the first substrate and the second substrate. The pixel unit comprising at least two kinds of transparent areas and multiple liquid crystal material injected into the transparent areas. A penetration rate of each liquid crystal materials is injected into in the transparent areas are different. The display panel and the display device can enhance a pixel penetration rate and effectively suppress a grayscale whiting or appear color shift at a large viewing angle.

Optionally, liquid crystal materials comprise the first liquid crystal material, the second liquid crystal material, and the third liquid crystal material. The transparent areas comprise the first transparent area, the second transparent area, and the third transparent area. The first liquid crystal material is injected into the first transparent area. The second liquid crystal material is injected into the second transparent area. The third liquid crystal material is injected into the third transparent area.

Optionally, a penetration rate of the first liquid crystal material, the second liquid crystal material, and the third liquid crystal material increase gradually. Correspondingly, a penetration rate of the first transparent area, the second transparent area, and the third transparent area increases in sequence.

Optionally, the display panel further comprises scanning line, data lines, and active switches. The data lines are connected with the scanning line and the active switches. The scanning line and the data lines are perpendicularly disposed. The second transparent areas are disposed on a first side of the scanning line. The first transparent area and third transparent area are disposed on a second side of the scanning line.

Compared with a commonly used Mutidomain Vertical Alignment (MVA) technology, the present application utilizes liquid crystal materials with different penetration rate in different transparent areas respectively to divide a plurality of transparent areas, thereby improving color shift. The multi-scope compensation effect under a large viewing angle, so that, the display panel and the display device can enhance a pixel penetration rate and effectively suppress a grayscale whiting or appear color shift at a large viewing angle. Compared with the method of voltage division, the manufacturing process and the driving method are simple.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Obviously, the accompanying drawings in the following descriptions are merely some embodiments of this application. A person of ordinary skill in the art may further obtain other accompanying drawings according to these accompanying drawings without creative efforts. In the accompanying drawings.

DETAILED DESCRIPTION OF EMBODIMENTS

Figure 1:
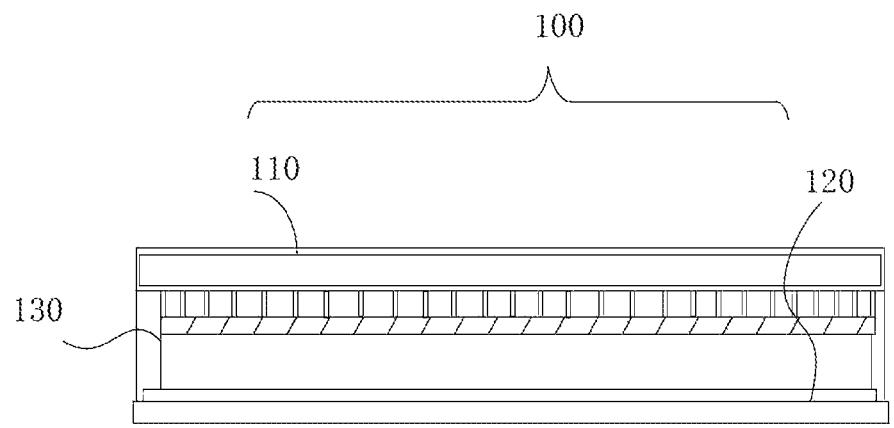
FIG. 1 is a schematic sectional structural diagram of a display panel according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In addition, the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

In addition, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

This application is described below with reference to the accompanying drawings and examples of embodiments.

As shown in FIG. 1 to FIG. 6, an embodiment of this application discloses a display panel 100, including a first substrate 110, a second substrate 120 parallel arranged to the first substrate 110, a pixel unit 130 formed between the first substrate 110 and the second substrate 120. The pixel unit 130 including at least two kinds of transparent areas 140 and liquid crystal materials 150 is injected into the transparent areas 140. A penetration rate of each of the liquid crystal materials 150 is injected into the transparent areas 140 are different.

The application utilizes liquid crystal materials 150 with different penetration rate in different transparent areas 140 respectively to divide a plurality of light and dark transparent area, thereby improving color shift. The multi-scope compensation effect under a large viewing angle. It is equivalent to divide a plurality areas instep the traditional method of voltage division. Therefore, reducing manufacturing processes and saving dissipation voltage when voltage driving the liquid crystal.

In the first embodiment, the liquid crystal materials 150 include a first liquid crystal material 151, a second liquid crystal material 152, and a third liquid crystal material 153. The transparent areas 140 includes a first transparent area 141, a second transparent area 142, and a third transparent area 143. The first liquid crystal material 151 is injected into the first transparent area 141. The second liquid crystal material 152 is injected into the second transparent area 142. The third liquid crystal material 153 is injected into the third transparent area 143. The first transparent area 141, the second transparent area 142, and the third transparent area 143 are respectively a main transparent area, sub transparent area and sub-second transparent area. However, it not any limit to the transparent areas. The main transparent area further as the second transparent area 142 or third transparent area 143.

Figure 3:
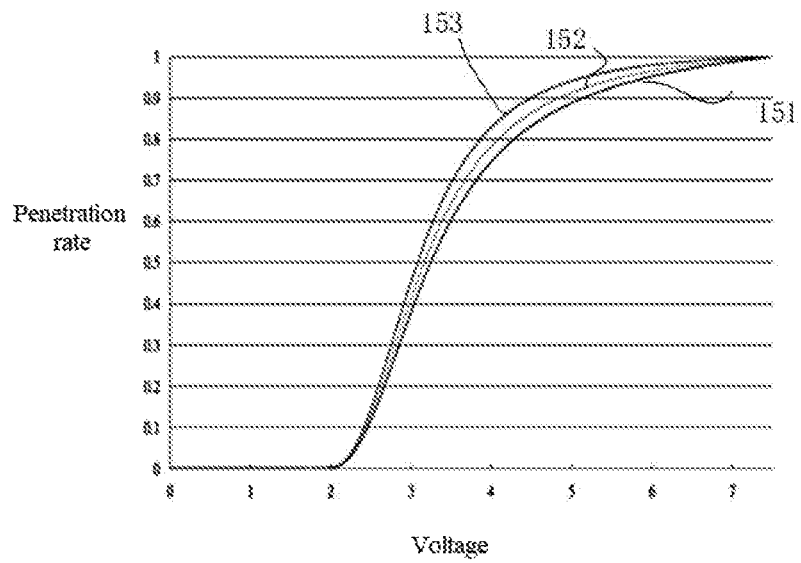
FIG. 3 is a graph of a penetration rate of Gamma line voltage according to an embodiment of this application.
Figure 4:
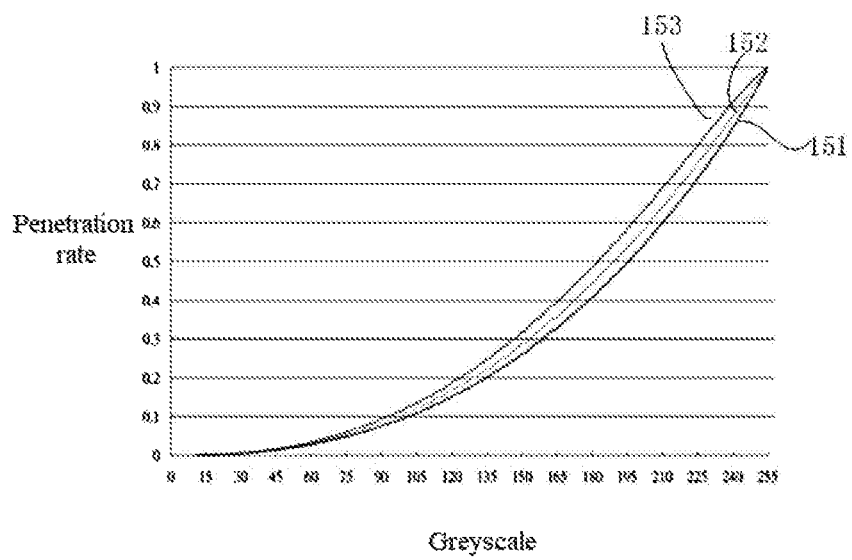
FIG. 4 is a graph of a penetration rate of Gamma line grey scale according to an embodiment of this application.
Figure 5:
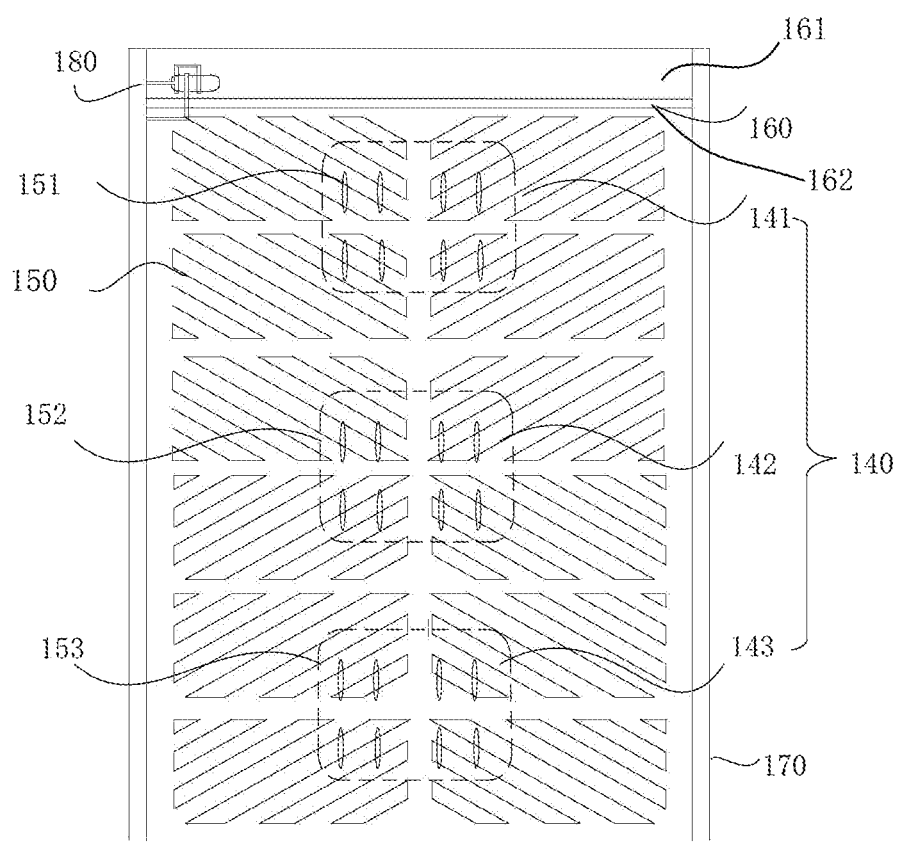
FIG. 5 is a schematic structural diagram of a display panel pixel according to an embodiment of this application.

As shown in FIGS. 3-5, in the application, three transparent areas are respectively corresponding to three different liquid crystal materials 150. Therefore, a penetration rate of three transparent areas are different to improve color shift. The transparent area 141 sprays on the first liquid crystal material 151. The second transparent area 142 sprays on the second liquid crystal material 152. The third transparent area 143 sprays on the third liquid crystal material 153. Since the penetration rate of three liquid crystal materials are different, the first liquid crystal material 151 is greater than the second liquid crystal material 152 and the second liquid crystal material 152 is greater than the third liquid crystal material 153. Therefore, three transparent areas mutual equilibrium to improve the color shift or grayscale white when large viewing angle. The difference between penetration rate of three transparent areas 140 are more obviously.

Figure 2:
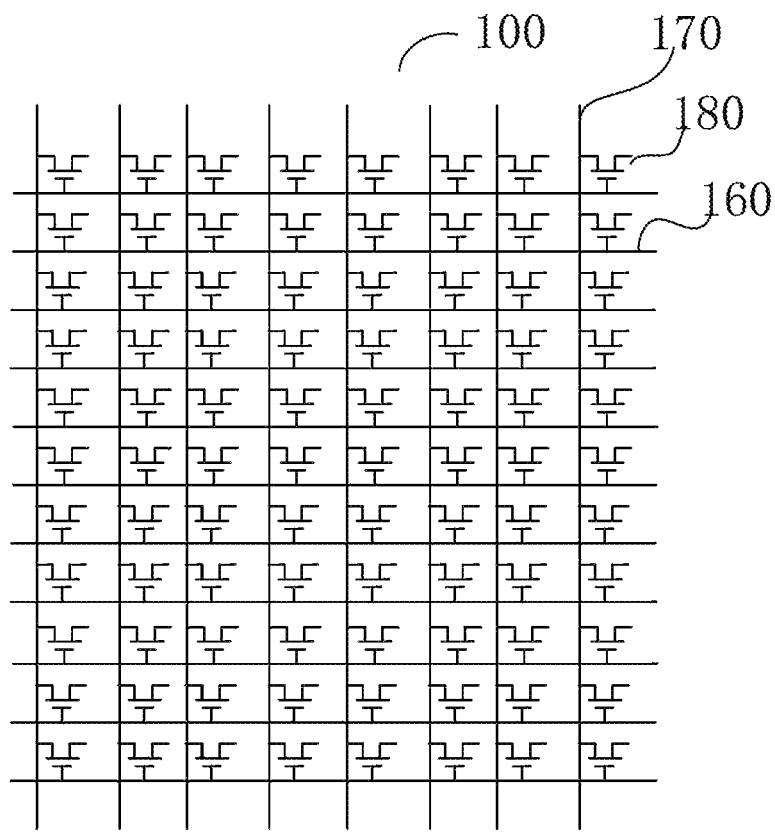
FIG. 2 is a schematic structural diagram of a display panel according to an embodiment of this application.

As shown in FIGS. 2 and 5, in the first embodiment, the display panel 100 further includes scanning line 160, data lines, and active switches. The data lines are connected with the scanning line 160 and the active switches. The scanning line 160 and the data lines are perpendicularly disposed. A first transparent areas 141, a second transparent areas 142, and a third transparent areas are disposed on a same side of the scanning line 160.

In the application, the transparent areas 140 are on the same side. Since the scanning line 160 are connected with the active switches 180, when a voltage is applied to drive liquid crystal molecules, the penetration speed of the backlight is faster, therefore, the display time is greatly shortened.

In one or more embodiments, a distance between three kinds of transparent areas 140 and the active switches 180 is greater, the penetration rate is less.

In the application, the distance of transparent areas 140 and the active switches 180 is greater, the penetration rate is less. The active switches 180 is less influenced to a public voltage since the high penetration speed needs more voltage.

As shown in FIG. 5, in one or more embodiments, area of the first transparent area 141, area of the second transparent area 142, and area of the third transparent area 143 are same.

In the application, an aperture ratio is the ratio of an area effective transparent areas of the pixel to total area of the pixel. The area of the three transparent areas 140 are the same and the aperture ratio does not affect each other. The grayscale whitening can effectively suppress when the large viewing angle.

Figure 6:
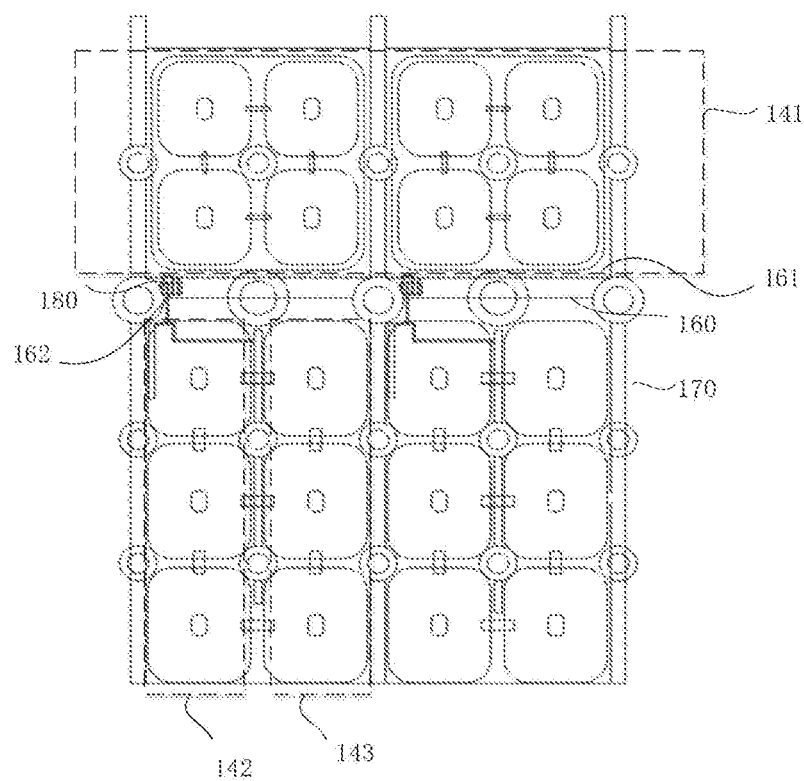
FIG. 6 is a second schematic structural diagram of a display panel pixel according to an embodiment of this application.

As shown in FIGS. 2 and 6, in one or more embodiments, the display panel 100 further includes scanning line 160, data lines 170, and active switches 180. The data lines 170 are connected with the scanning line 160 and the active switches 180. The scanning line 160 and the data lines 170 are perpendicularly disposed. The second transparent area 142 is disposed on a first side 161 of the scanning line 160. The first transparent area 141 and third transparent area 143 are disposed on a second side 162 of the scanning line 160.

In the application, the second transparent area 142 is disposed on a first side 161 of the scanning line 160. The first transparent area 141 and third transparent area 143 are disposed on a second side 162 of the scanning line 160. A multi areas are driven by the different scanning line respectively. Since different areas require different voltage, different scanning line 160 and the data lines 170 are used respectively.

As shown in FIG. 6, in one or more embodiments, three kinds of the transparent areas are divided by specific area ratio. An area ratio between the first transparent area 141 and the third transparent area 143 is one to one. The area ratio between the second transparent area 142 and a sum of the first transparent area 141 and the third transparent area 143 is three to two.

In this application, divide up a pixel transparent area by the ratio mention above, to generate multi-domain areas and meet the multi areas divide. Therefore, when the transparent panel in the penetrate mode, reducing diffraction to increase the pixel penetration rate and improving color shift in the background image.

As shown in FIGS. 1-6, in one or more embodiments of the application further disclosures the display panel 100, including the first substrate 110, the second substrate 120 parallel arranged to the first substrate 110, the pixel unit 130 formed between the first substrate 110 and the second substrate 120. The pixel unit 130 including at least two kinds of transparent areas 140 and the liquid crystal materials 150 is injected into the transparent areas 140. And the liquid crystal materials include the first liquid crystal material 151, the second liquid crystal material 152 and the third liquid crystal material 153. The first liquid crystal material 151 is injected into the first transparent area 141. The second liquid crystal material 152 is injected into the second transparent area 142. The third liquid crystal material 153 is injected into the third transparent area 143.

The display panel further includes scanning line 160, data lines 170, and active switches 180. The data lines 170 are connected with the scanning line 160 and the active switches 180. The scanning line 160 and the data lines 170 are perpendicularly disposed.

The second transparent area are disposed on a first side 161 of the scanning line 160. The first transparent area and third transparent area are disposed on a second side 162 of the scanning line 160.

Three kinds of the transparent areas 140 are divided by specific area ratio. An area ratio between the first transparent area 141 and the third transparent area 143 is one to one. The area ratio between the second transparent area 142 and a sum of the first transparent area 141 and the third transparent area 143 is three to two.

In one or more embodiments, the liquid crystal materials comprise benzoate acid ester materials.

In the application, the two benzene rings in the central portion of such a liquid crystal compound are connected by an ester. The liquid crystal has good stability and high viscosity. A biphenyl, a terphenyl, a phenyl cyclohexane and a biphenylene ring are also can be the liquid crystal materials of the present application which depending on the panel condition.

Figure 7:
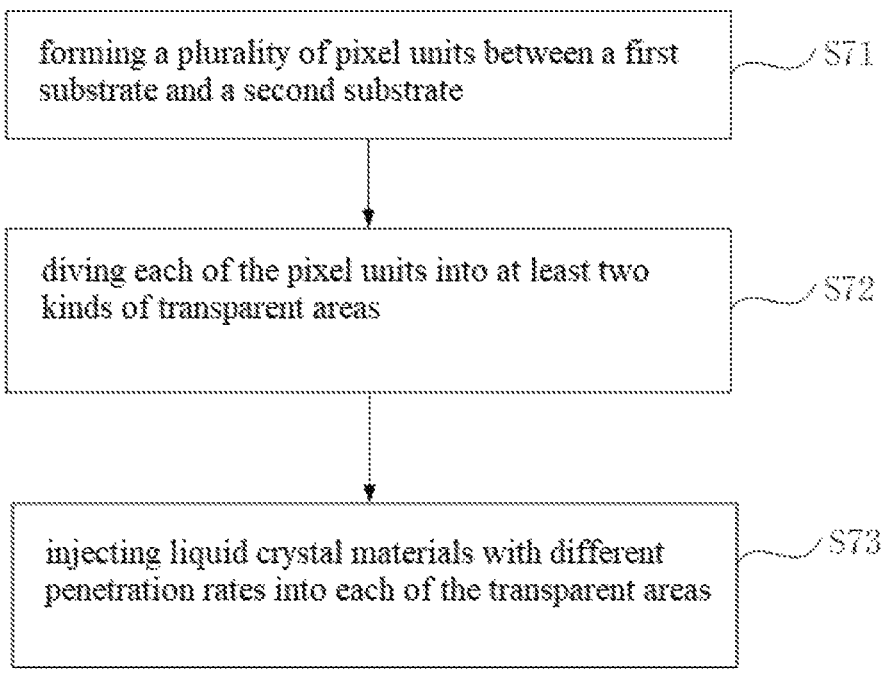
FIG. 7 is a flow chart of a manufacturing method of a display panel according to an embodiment of this application.

As shown in FIG. 7, in one or more embodiments of the application further disclosure a manufacturing method of a display panel, steps including:

S71: forming a plurality of pixel units between a first substrate and a second substrate;

S72: diving each of the pixel units into at least two kinds of transparent areas;

S73: injecting liquid crystal materials with different penetration rates into each of the transparent areas.

In one or more embodiments, a step of inject liquid crystal materials having different penetration rates into each of the transparent areas including:

injecting the liquid crystal material into the transparent areas through a spray method.

In the application, a traditional technology of adjust the liquid crystal to inject and other technology processes do not change. Since the three multi areas are required to inject different liquid crystal materials 140, an ink jet method is more easily achieved than the traditional method, which can improve the color casting in the basis and inject the liquid crystal quickly to enhance the productivity.

The display panel 100 of manufacturing method of the present embodiment is applied to any of the above applications.

Figure 8:
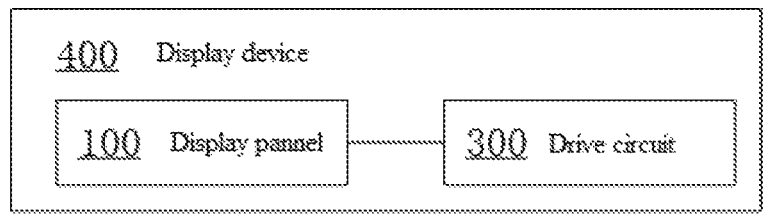
FIG. 8 is a schematic diagram of a display device of an embodiment of this application.

As shown in FIG. 8, in one or more embodiments of the application further disclosure a display device 400, including any of the above display panels 100.

It should be noted that the limitation of each step involved in the present disclosure is not determined to limit the sequence of steps without affecting the implementation of the specific solution. Steps written in the foregoing can be executed first, or later, or even simultaneously as long as the specific solutions can be implemented, which should be considered as the scope of the present disclosure.

The present disclosure is able to be applied on various display panels, such as a Twisted-Nematic (TN) type display panel, In-Plane Switching (IPS) type display panel, a Vertical-Alignment (VA) type display panel, and Multi-domain Vertical Alignment (MVA) type display panel. Of course, the display panel can be other types of display panels which is able to be applied, such as an Organic Light-Emitting Diode (OLED) display panel.

The above content is a further detailed description of the present disclosure in conjunction with the specific embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A display panel, comprising:
a first substrate;
a second substrate, arranged in parallel with the first substrate;
a subpixel, formed between the first substrate and the second substrate, the subpixel comprising at least two non-overlapping transmissive areas and a plurality of liquid crystal materials injected into the respective transmissive areas, wherein a transmittance of each of the liquid crystal materials injected into the respective transmissive areas is different, for multi-domain compensation under a large viewing angle;
wherein the plurality of liquid crystal materials comprise a first liquid crystal material, a second liquid crystal material, and a third liquid crystal material;
wherein the non-overlapping transmissive areas comprise a first transmissive area, a second transmissive area, and a third transmissive area; and the first liquid crystal material is injected into the first transmissive area, the second liquid crystal material is injected into the second transmissive area, and the third liquid crystal material is injected into the third transmissive area;
wherein the subpixel is driven by a combination of a single scanning line, a single data line, and a single active switch coupled to the single scanning line and the single data line of the display panel; wherein the subpixel is a red subpixel, a green subpixel, or a blue subpixel.

2. The display panel according to claim 1, wherein the three non-overlapping transmissive areas are divided by a specific area ratio; and an area ratio of the first transmissive area to the third transmissive area is one to one.

3. The display panel according to claim 1, wherein the liquid crystal materials comprise benzoate acid ester materials.

4. The display panel according to claim 1, wherein transmittances of the first liquid crystal material, the second liquid crystal material, and the third liquid crystal material increase in sequence; correspondingly, transmittances of the first transmissive area, the second transmissive area, and the third transmissive area increase in sequence.

5. The display panel according to claim 1, wherein the first transmissive area, the second transmissive area, and the third transmissive area are disposed on a same side of the single scanning line configured to drive the subpixel.

6. The display panel according to claim 1, wherein of the three non-overlapping transmissive areas of the subpixel, the greater the distance from a transmissive area to the single active switch configured to drive the subpixel, the less the respective transmittance of the transmissive area.

7. The display panel according to claim 1, wherein the second transmissive area is disposed on a first side of the single scanning line configured to drive the subpixel; and the first transmissive area and the third transmissive area are disposed on a second side of the single scanning line configured to drive the subpixel.

8. The display panel according to claim 1, wherein an area ratio of the second transmissive area to a sum of the first transmissive area and the third transmissive area is three to two.

9. The display panel according to claim 1, wherein the first liquid crystal material is sprayed onto the first subpixel, the second liquid crystal material is sprayed onto the second subpixel, and the third liquid crystal material is sprayed onto the third subpixel.

10. A manufacturing method of a display panel, comprising:
forming a plurality of subpixels between a first substrate and a second substrate;
dividing each of the subpixels into at least two non-overlapping transmissive areas;
injecting a plurality of liquid crystal materials with different transmittances into the non-overlapping transmissive areas respectively for multi-domain compensation under a large viewing angle;
wherein the liquid crystal materials comprise a first liquid crystal material, a second liquid crystal material, and a third liquid crystal material, wherein the non-overlapping transmissive areas comprise a first transmissive area, a second transmissive area, and a third transmissive area; and the first liquid crystal material is injected into the first transmissive area, the second liquid crystal material is injected into the second transmissive area, and the third liquid crystal material is injected into the third transmissive area;
wherein the subpixel is driven by a combination of a single scanning line, a single data line, and a single active switch coupled to the single scanning line and the single data line of the display panel; wherein the subpixel is a red subpixel, a green subpixel, or a blue subpixel.

11. The manufacturing method according to claim 10, wherein injecting the liquid crystal materials with different transmittances into the transmissive areas comprises:
   injecting the liquid crystal materials into the respective non-overlapping transmissive areas using a spray method.

12. The manufacturing method according to claim 10, wherein a transmittance of the first liquid crystal material is greater than a transmittance of the second liquid crystal material; and a transmittance of the second liquid crystal material is greater than a transmittance of the third liquid crystal material.

13. The manufacturing method according to claim 10, wherein an area ratio of the second transmissive area to a sum of the first transmissive area and the third transmissive area is three to two.

14. A display device, comprising a display panel and a drive circuit; wherein the display panel comprises:
   a first substrate;
   a second substrate, arranged in parallel with the first substrate;
   a subpixel, formed between the first substrate and the second substrate;
   the subpixel comprising at least two non-overlapping transmissive areas and a plurality of liquid crystal materials injected into the respective transmissive areas;
   wherein a transmittance of each of the liquid crystal materials injected into the respective transmissive areas is different for multi-domain compensation under a large viewing angle;
   wherein the plurality of liquid crystal materials comprise a first liquid crystal material, a second liquid crystal material, and a third liquid crystal material; wherein the non-overlapping transmissive areas comprise a first transmissive area, a second transmissive area, and a third transmissive area; and the first liquid crystal material is injected into the first transmissive area, the second liquid crystal material is injected into the second transmissive area, and the third liquid crystal material is injected into the third transmissive area;
   wherein the subpixel is driven by a combination of a single scanning line, a single data line, and a single active switch coupled to the single scanning line and the single data line of the display panel; wherein the subpixel is a red subpixel, a green subpixel, or a blue subpixel.

15. The display device according to claim 14, wherein transmittances of the first liquid crystal material, the second liquid crystal material, and the third liquid crystal material increase in sequence; correspondingly, transmittances of the first transmissive area, the second transmissive area, and the third transmissive area increase in sequence.

16. The display device according to claim 14, wherein
   the second transmissive area is disposed on a first side of the single scanning line configured to drive the subpixel; the first transmissive area and third transmissive area are disposed on a second side of the single scanning line configured to drive the subpixel.

* * * * *